United States Patent
Prakash et al.

(10) Patent No.: US 8,181,032 B2
(45) Date of Patent: May 15, 2012

(54) METHOD AND APPARATUS WITH CHIPSET-BASED PROTECTION FOR LOCAL AND REMOTE AUTHENTICATION OF BOOTING FROM PERIPHERAL DEVICES

(75) Inventors: Gyan Prakash, Beaverton, OR (US); Mousumi M. Hazra, Beaverton, OR (US); Selim Aissi, Beaverton, OR (US); Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1033 days.

(21) Appl. No.: 12/119,914

(22) Filed: May 13, 2008

(65) Prior Publication Data

US 2009/0287938 A1    Nov. 19, 2009

(51) Int. Cl.
   *G06F 21/00*    (2006.01)
(52) U.S. Cl. .............. 713/186; 713/2; 713/164; 726/19; 726/23
(58) Field of Classification Search ............... 713/2, 186
   See application file for complete search history.

(56) References Cited

U.S. PATENT DOCUMENTS

| | | | | |
|---|---|---|---|---|
| 6,105,130 | A * | 8/2000 | Wu et al. | 713/2 |
| 7,540,028 | B2 * | 5/2009 | Ahmed et al. | 726/23 |
| 2004/0059907 | A1 * | 3/2004 | Cochran et al. | 713/2 |
| 2005/0273603 | A1 * | 12/2005 | Girard | 713/164 |
| 2008/0238612 | A1 * | 10/2008 | Carpenter | 340/5.74 |
| 2008/0249947 | A1 * | 10/2008 | Potter | 705/67 |
| 2009/0249478 | A1 * | 10/2009 | Rosener et al. | 726/19 |

OTHER PUBLICATIONS

Margaret Quan, "Partnerships Prep Fingerprint-ID System for PCs", Nov. 23, 1998, ElectronicEngineering Times, p. 31.*

* cited by examiner

*Primary Examiner* — Taghi Arani
*Assistant Examiner* — Gregory Lane
(74) *Attorney, Agent, or Firm* — Schwabe, Williamson & Wyatt, P.C.

(57) ABSTRACT

Method and apparatus enabling a computing system to deter or thwart unauthorized boot-up from peripheral devices are disclosed herein. In various embodiments, a monitoring module and a managing module are employed cooperating with each other to authorize users in booting up the computing system from peripheral devices.

12 Claims, 3 Drawing Sheets

METHOD AND APPARATUS WITH CHIPSET-BASED PROTECTION FOR LOCAL AND REMOTE AUTHENTICATION OF BOOTING FROM PERIPHERAL DEVICES

TECHNICAL FIELD

Embodiments of the disclosure relate to the field of data processing, in particular, to methods and apparatuses for deterring or thwarting unauthorized boot-up of processor-based computing systems from peripheral devices.

BACKGROUND

With processor-based computing systems such as laptops getting more and more ubiquitous and mobile, theft or misuse of such mobile computing systems becomes more and more common. Peripheral devices, such as integrated drive electronics (IDE) devices or universal serial bus (USB) devices, are used to boot up the computing systems in order to access unauthorized applications.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the disclosure include, but are not limited to, methods and apparatuses for protecting user-data and deterring theft of processor based devices.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
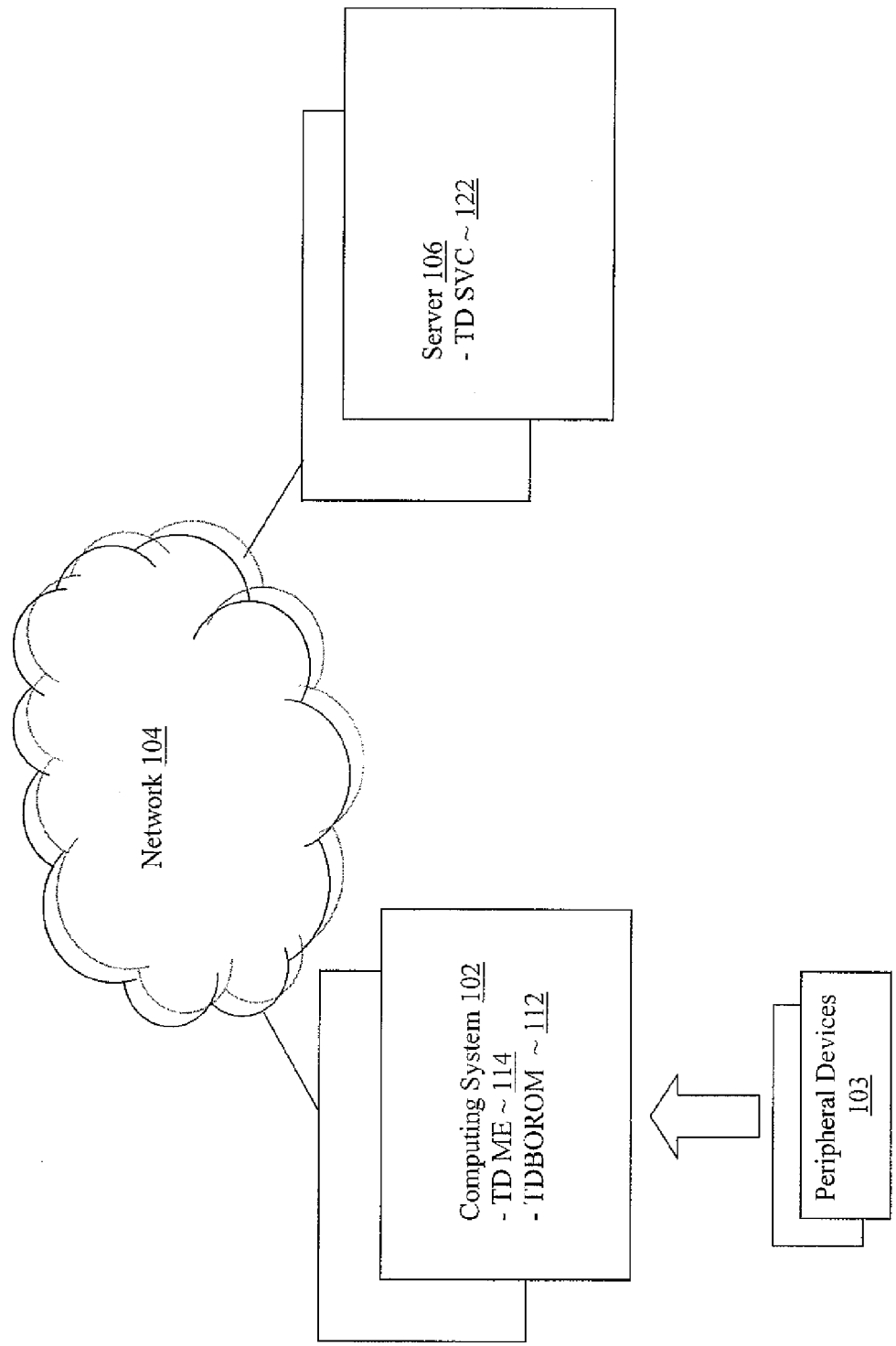
FIG. 1 illustrates an overview of various embodiments of the disclosure.

FIG. 1 illustrates an overview of various embodiments of the disclosure. As illustrated, each processor-based computing system 102 may be provided with a theft-deterrence monitoring module (TDBOROM) 112. In various embodiments, the TDBOROM 112 may be part of a basic input/output system (BIOS) Option ROM. In various embodiments, TDBOROM 112 may be disposed in a chipset. In embodiments, the TDBOROM 112 may be configured to operate in conjunction with a managing module (TD ME) 114 which may be a manageability engine. TDBOROM 112 and TD ME 114 may be configured to cooperate with each other to deter or thwart unauthorized boot-up of computing system 102 from peripheral devices 103, such as IDE or USB devices. A remote theft-deterrence service (TD SVC) 122 implemented on one or more remotely disposed servers 106, may also be available to facilitate the theft deterrence process. And, remotely disposed servers 106 may be accessible from computing system 102 via network 104. In embodiments, TD ME 114 may be configured to communicate with TD SVC 122, independent of a central processing unit (CPU) of computing system 102 configured to operate an application execution environment.

In various embodiments, TDBOROM 112 may be configured to operate in the processor operated application execution environment of computing system 102, whereas TD ME 114 may be configured to operate outside the application execution environment. In embodiments, TDBOROM 112 and the application execution environment may be operated by one of a plurality of processor cores of computing system 102, and TD ME 114 may be configured to operate in another processor core. In embodiments, computing system 102 may have one or more processor operated application execution environments, virtual or otherwise.

Further, computing system 102 may be any one of a number of processor based devices, including but are not limited to desktop computing devices, portable computing devices (laptops as well as handhelds), set-top boxes, and game consoles. Handhelds may include, but are not limited to, personal digital assistants, digital cameras, media players, and mobile phones. Servers 106 may be any number of servers, including but are not limited to blade servers. Network 104 may include one or more private and/or public, wire line based and/or wireless, local and/or wide area networks.

Additionally, for the illustrated embodiments, to deter or thwart theft or misuse of computing system 102, TD ME 114 may include, but is not limited to, locking down computing system 102, restarting computing system 102 and preventing it from being used again, or deleting or hiding cryptographic key-material to prevent data-theft on a stolen device.

These and other aspects of the various embodiments, including the various elements and the manner the elements cooperate with each other to deter theft or misuse of computing system 102, will be described in further details in turn below.

Figure 2:
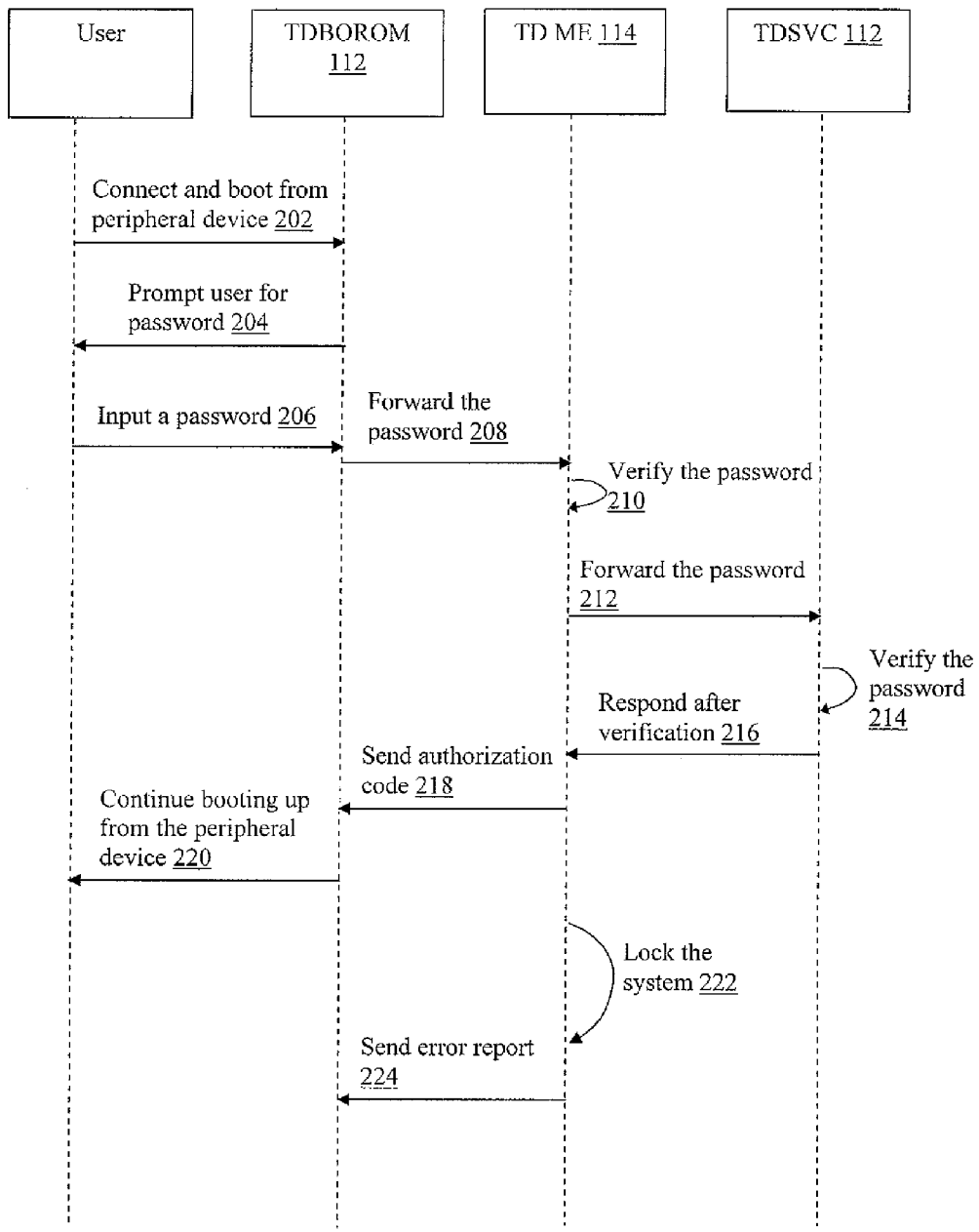
FIG. 2 illustrates selected operations of selected components of a processor-based computing system, in accordance with various embodiments of the disclosure.

Referring now to FIG. 2, wherein a method to avoid unauthorized boot-up from peripheral devices in accordance with embodiments of the disclosure is illustrated. As shown, the method may start with a user connecting 202 peripheral device 103 to computing system 102, which may be detected by TDBOROM 112. Upon detection, TDBOROM 112 may prompt 204 the user for an authentication token in order to verify if the user is authorized to boot up computing system 102 from peripheral device 103. The authentication token may be a password or biometric fingerprint and so forth, and hereinafter a password is used for illustration purpose. The user may input 206 a password to TDBOROM 112 after being prompted. In response to the receipt of the inputted password, TDBOROM 112 may forward 208 the password to TD ME 114.

Upon receiving the forwarded password, TD ME 114 may verify 210 the password locally. In embodiments, a reference password is stored in TD ME 114 or somewhere else in computing system 102 that can be accessed by TD ME 114. The user may be deemed as authorized if the inputted password is the same as the stored reference. In other embodiments, TD ME 114 may communicate with remotely disposed TD SVC 122 and may forward 212 the password to TD SVC 122 via network 104 for verification. In this case, TD SVC 122 may verify 214 the password and respond 216 to TD ME 114 with a result of the verification.

Regardless of whether the verification is performed at TD ME 114 or at TD SVC 122, TD ME 114 may send 218 an authorization code to TDBOROM 112 if the inputted password is verified to be a correct password authenticating the user as having the proper authority to boot computer system 102 from a peripheral device. At such time, TDBOROM 112 may permit 220 the user to continue booting computing system 102 from the peripheral device by sending an operational control to boot sequence on the peripheral device.

In various embodiments, the inputted password may be verified to be incorrect. Thus, computing system 102 may be locked up 222 by TDBOROM 112 and/or TD ME 114 in order to timely deter or thwart the theft or misuse. In other embodiments, the user may be given a pre-defined number of authentication attempts to have the correct password inputted. Under such situation, after a password is verified to be incorrect, TD ME 114 may send 224 an error report to TDBOROM 112. TDBOROM 112 may repeat to prompt 204 the user for a password again. And the whole process stated above may be repeated. After the user has tried a pre-defined number of times and no correct password is inputted, TD ME 114 may lock up 222 computing system 102 to deter theft or misuse by the unauthorized user.

In embodiments, the pre-defined number of authentication attempts for the user to enter a password may be decided by TD SVC 122. In embodiments, before the method starts, a Power On Self Test (POST) may be completed and all the BIOS Option ROMs are initiated.

In embodiments, unauthorized user may hack and replace TDBOROM 112. However, computing system 102 cannot be booted up without consent from TD ME 114. In embodiments, TD ME 114 may lock up 222 computing system 102 if no password is entered, which may be an indication that TDBOROM 112 is hacked or replaced.

Figure 3:
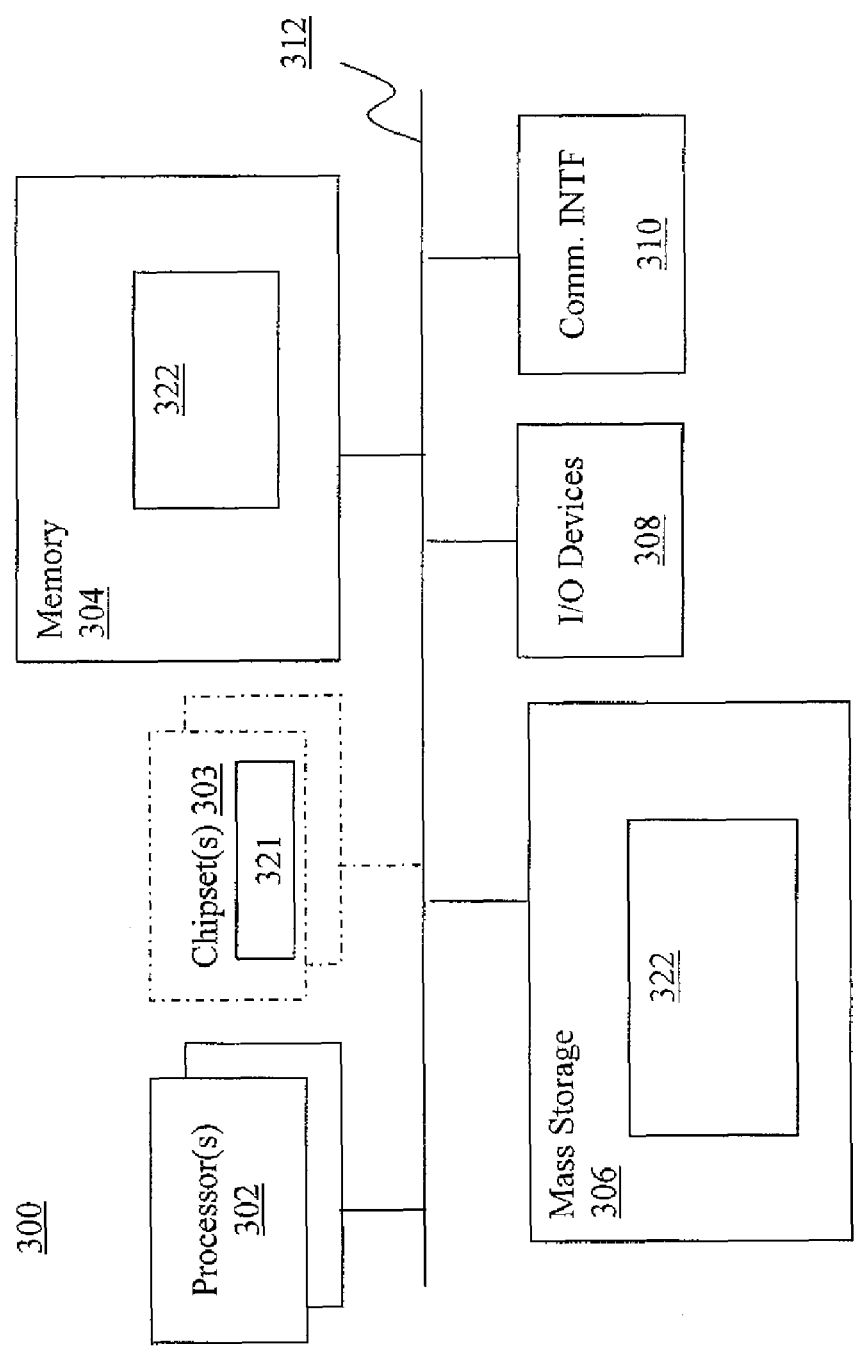
FIG. 3 illustrates an example system suitable for use to practice various embodiments of the disclosure.

FIG. 3 illustrates an example system suitable for use to practice various embodiments of the present disclosure. As shown, system 300 includes a number of processors or processor cores 302, and system memory 304. For the purpose of this application, including the claims, the terms "processor" and "processor cores" may be considered synonymous, unless the context clearly requires otherwise. System 300 may further include chipset 303. Additionally, system 300 may include mass storage devices 306 (such as diskette, hard drive, compact disc read only memory (CDROM) and so forth), input/output devices 308 (such as display, keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown).

Each of these elements performs its conventional functions known in the art. In particular, chipset 303 may be employed to practice all or some of the described aspects of TDBOROM 112 (shown as 321). And TD ME 114 may be operated by one of the processors or processor cores 302. Selected firmware components may be implemented by assembler instructions supported by processor(s) 302. Other software components may be implemented in high-level languages, such as C, that can be compiled into such instructions. The operation of TD ME 114 may be independent from the processors or processor cores 302 operating one or more application execution environment.

The permanent copy of programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices. In embodiments, the distribution medium may be an article of manufacture having programming instructions configured to implement one or more aspects of one or more methods as disclosed herein. More specifically, the article of manufacture may comprise a computer readable storage medium having the plurality of programming instructions stored in the storage medium. The programming instruction may then be read or loaded into the system to practice or contribute to the practice of the methods described herein to deter or thwart unauthorized boot-up of processor-based computing systems from peripheral devices.

The constitution of these elements 302-312 are known, and accordingly will not be further described.

Therefore, by adopting the method and apparatus disclosed above, a robust theft deterrence mechanism is built to deter or thwart unauthorized booting up of computing systems from peripheral devices.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A method, comprising:
   monitoring, by a first module of a basic input and output system (BIOS) of a computing system, for boot-up of the computing system from a device peripheral to the computing system, the first module being operated by a first processor of the computer system, in an application execution environment operated by the first processor;
   on detection of a boot-up by the first module, prompting, by the first module, for an authentication token;
   on receiving an authentication token in response to the prompting, transmitting to a second module operated by a second processor of the computer system, by the first module, the received authentication token, the first and second processors being operationally independent; and
   on receiving the authentication token from the first module, determining, by the second module, whether to permit the detected boot-up to proceed, based at least in part on the received authentication token; and wherein the determining comprises verifying, by the second module, validity of the received authentication token, and wherein verifying comprises verifying, by the second module, the validity of the received authentication token with a server remote from the computing system.

2. The method of claim 1, further comprising transferring, by the first module, operational control to a boot-up sequence on the peripheral device after the second module permits the detected boot-up to continue.

3. The method of claim 1, further comprising locking up the computing system, by the second module, on determining not to permit the detected boot-up to proceed.

4. The method of claim 1, wherein the monitoring comprises monitoring for boot-up of the computing system from an integrated drive electronics (IDE) device peripheral to the computing system.

5. The method of claim 1, wherein the monitoring comprises monitoring for boot-up of the computing system from a universal serial bus (USB) device peripheral to the computing system.

6. The method of claim 1, wherein prompting comprises prompting for an authentication token for a pre-defined number of times.

7. The method of claim 1, wherein the received authentication token is a password.

8. The method of claim 1, wherein the received authentication token is a biometric fingerprint.

9. An apparatus, comprising:
 a first processor configured to operate an application execution environment;
 a basic input/output system (BIOS) including a monitor, configured to be operated by the first processor in the application execution environment;
 a second processor operationally independent of the first processor; and a management module configured to be operated by the second processor; wherein the management module is configured to provide management service to the apparatus, and the monitor is configured to provide device services to the operating system,; and
 wherein the monitor and the management module are further configured to cooperate to protect the apparatus from unauthorized system boot-up from devices peripheral to the apparatus, including the monitor configured to monitor for a boot up of the apparatus from a device peripheral to the apparatus; to prompt for an authentication token, in response to a detection; and to transmit an authentication token in response to the prompt to the managing module, and the management module configured to determine whether to permit a detected boot up, based at least in part on a received authentication token; and wherein the management module is configured to verify validity of the received authentication token with a remote authentication server.

10. An article of manufacture, comprising:
 a non-transitory storage medium; and
 a plurality of programming instructions stored on the storage medium and configured to be part of a basic input/output system (BIOS) of a computer system to be operated in an application execution environment operated by a first processor of the computer system, to enable the computing system, by executing the programming instructions using the first processor, to
 monitor for boot-up of the computing system from a device peripheral to the computing system;
 on detection of a boot up, prompt for an authentication token; and on receipt of an authentication token in response to the prompt, transmit the received authentication token to a management module of the computer system; wherein the management module is operated by a second processor that is operationally independent of the first processor, and configured to determine whether to permit the detected boot-up to proceed, based at least in part on the received authentication token; and wherein the management module is further configured to verify validity of the received authentication token.

11. The article of manufacture of claim 10, wherein the programming instructions are further configured to transfer operational control to a boot-up sequence on the peripheral device after the computer system is permitted to continue the boot-up.

12. The article of manufacture of claim 10, wherein the management module is further configured to lock up the computing system on determining not to permit the detected boot-up to proceed.

* * * * *